United States Patent Office 2,726,238
Patented Dec. 6, 1955

2,726,238
OXIME AZO DYESTUFFS

Heinrich Morschel, Leverkusen, and Karlfried Wedemeyer, Leverkusen-Bayerwerk, Germany, assignors to Farbenfabriken Bayer Aktiengesellschaft, Leverkusen, Germany, a corporation of Germany No Drawing. Application February 16, 1954,
Serial No. 410,730

Claims priority, application Germany February 26, 1953

7 Claims. (Cl. 260—160)

The present invention relates to metal complex forming azo dyestuffs, the metal complex compounds thereof and to a process of making the same; more particularly it relates to azo dyestuffs—mono-, dis- and polyazo dyestuffs—containing at least once a hydroxy group and in ortho-position thereto a ketoxime or an aldoxime group, and the metal complex compounds thereof.

The new dyestuffs are obtained by selecting in the usual synthesis of azo dyestuffs the components in such a way that the dyestuffs formed contain at least once in the molecule a hydroxy group and in ortho-position thereto a ketoxime or an aldoxime group. The new dyestuffs may further contain the usual substituents. Thus it may be expedient that starting components are used which contain further complex forming groups e. g. the ortho-hydroxy-carboxylic acid grouping, or hydroxy-, alkoxy-, carboxy-, oxyacetic acid and amino groups in o,o'-position to an azo bridge. The new dyestuffs may be mono- or polyazo dyestuffs prepared from diazo, diazoazo or tetrazo compounds; the characteristic ortho-hydroxy-ketoxime or -aldoxime grouping can be present once or several times in the dyestuff molecule, it can be present in the radical of the diazo component or in the radical of the coupling component or in both.

In the manufacture of the new dyestuffs not only such components can be used as contain already the ortho-hydroxy-ketoxime or -aldoxime grouping, but also compounds which contain an ortho-hydroxy- keto or -aldehyde grouping; in this case the carbonyl groups are transformed in usual manner into the ketoxime or aldoxime after coupling. It may also be expedient to choose for the formation of the dyestuffs such components as contain in ortho-position to a ketoxime or aldoxime group or to a keto or aldehyde group a group that can be changed into a hydroxy group e. g. a methoxy group, or can be exchanged for a hydroxy group e. g. halogen, and after coupling is complete to change those groups into or exchange them for hydroxy groups. In some cases it may also be advantageous, if the diazo component bears the grouping characteristic for the new dyestuff, to chrome the diazo component before the diazotization as this is done in the manufacture of azo dyestuffs which contain in the diazo component the salicylic acid grouping.

The new dyestuffs can be converted into their metal complex compounds in the usual manner either in substance, on the fibre or in the dye-bath. According to their constitution the new dyestuffs are suited for the dyeing of fibres of natural or regenerated cellulose, of fibres of animal origin or of synthetic fibres. The metal complex compounds formed in substance are suited for dyeing textile materials or as pigment according to their solubility.

The dyeings containing metal produced and obtained in one of the described ways are distinguished by clearness of the shades, good fastness to light and, first of all, by a good fastness to washing.

The new dyestuffs offer also the advantage that due to the presence of the ortho-hydroxy-aldoxime or -ketoxime grouping they need less acid salt forming solubilizing groups than comparable dyestuffs in order to be sufficiently soluble in the dye-bath; this water-solubilizing ortho-hydroxy-oxime-grouping characteristic for the new dyestuffs, however, is blocked in metal complex formation and therefore loses its solubilizing properties whereby dyeings of increased fastness to washing must be obtained.

The following examples illustrate the invention without, however, limiting it thereto.

Example 1

Tetrazotized 4,4'-diaminodiphenyl obtained in customary manner from 18.4 grams of 4,4'-diaminodiphenyl by diazotization in hydrochloric acid medium is run in at 5° C., into a solution of 31.5 grams of o-hydroxyacetophenone oxime in 800 cc. of water and 17 grams of NaOH, the mixture being kept alkaline by adding sodium carbonate. After the coupling is completed. the mixture is adjusted to pH 8–9 by means of hydrochloric acid under heating to 80° C. The separated dyestuff is filtered and dried. It corresponds to the formula:

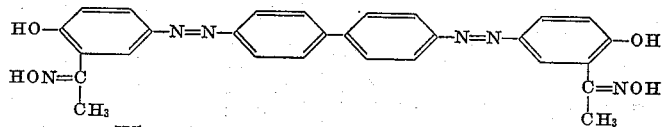

When dyed on cotton and after-coppered, the dyestuff yields a reddish yellow of excellent fastness to washing.

Example 2

55.5 grams of 4,4'-diamino-3,3'-dihydroxydiphenyl-dihydrochloride are diazotized in 1000 cc. of water and 25.5 cc. of hydrochloric acid with 34.5 grams of NaNO₂ at 5–7° C. After neutralizing with 16 grams of sodium carbonate the diazonium compound is sucked off, washed with water and thereafter pasted with 1000 cc. of water.

The paste of the diazotized 4,4'-diamino-3,3'-dihydroxydiphenyl is added to a solution of 67.25 grams of resacetophenoneoxime in 1500 cc. of water and 28 grams of NaOH at 5° C. After 8 hours the temperature is allowed to rise to room-temperature, and the mixture is stirred for further 50 hours. The mixture is then adjusted to pH 8.5 by means of hydrochloric acid, and the dyestuff is salted out with sodium chloride. After filtering and drying a dyestuff is obtained corresponding to the following formula:

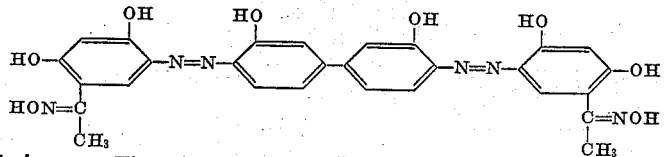

The dyestuff dissolves in water with a violet color. The after-coppered dyeing on cotton is reddish navy-blue and shows excellent fastness to washing and very good fastness to light and to brightening.

If as azo component instead of the resacetophenone oxime the equivalent quantity of resorcylaldoxime, or resopropiophenone oxime or resobutyrophenone oxime is employed, corresponding dyestuffs are obtained that show similar properties with regard to water-solubility, shade on cotton and fastness properties of the dyeings.

Example 3

The diazo solution obtained from 33 grams of 4,4'-diaminodiphenyl urea-3,3'-dicarboxylic acid in customary manner by diazotization in hydrochloric acid medium is run into a solution of 34 grams of resacetophenone oxime in 800 cc. of water and 21 grams of NaOH at 5° C., the reaction mixture being kept alkaline by adding sodium carbonate. After the coupling is completed, the separation of the dyestuff is accomplished by adding sodium chloride. It corresponds to the following formula:

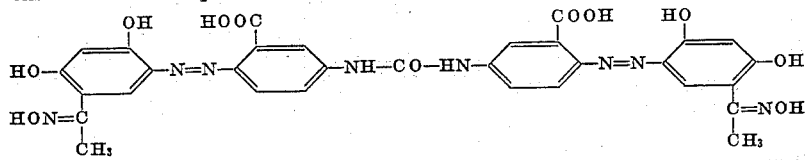

Whein dyed on cotton and after-coppered a red-brown dyeing is obtained showing very good fastness to washing and to light.

Example 4

25.7 grams of 4-amino-3'-carboxy-4'-hydroxy-azobenzene are dissolved in 200 cc. of water and 4 grams of NaOH, 69 cc. of a 10 percent nitrite solution are added and the mixture is stirred into 200 grams of ice-water and 35 cc. of hydrochloric acid. To the diazotization mixture thus obtained a hydrochloric acid solution of 12.5 grams of 1-amino-2-methoxy-5-methylbenzene is added at 3° C. and the mineral acid is neutralized by means of sodium acetate. After the coupling is completed the aminodiazo dyestuff is sucked off; the filter cake is pasted with 1000 cc. of water and diazotized with 6.9 grams of sodium nitrite in hydrochloric acid medium. The diazotization mixture is stirred into a solution of 18.4 grams of resacetophenone oxime in 1000 cc. of water and 138 grams of sodium carbonate at 3° C. After 15 hours the temperature is raised to 70° C. and the dyestuff is sucked off. It corresponds to the following formula:

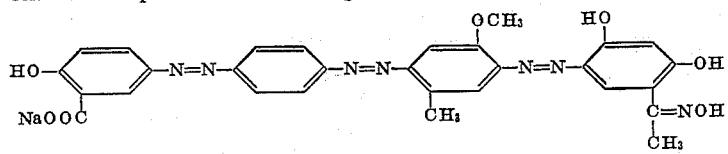

When dyed on cotton and after-coppered, a bordeaux is obtained showing very good fastness to washing.

The following table contains further combinations. Dyestuffs obtained from the components:

| Diazo component | Azo component | Shade of after-coppered dyeing on cotton |
| --- | --- | --- |
| 4,4'-diaminodiphenyl-3,3'-dioxyacetic acid. | 2 mol resacetophenone oxime. | violet. |
| 4,4'-diaminodiphenyl-3,3'-dicarboxylic acid. | ....do.... | red-violet. |
| Do.... | 1 mol resacetophenone oxime, 1 mol 2-benzoylamino-5-hydroxynaphthalene-7-sulfonic acid. | current. |
| Do.... | 1 mol resacetophenone oxime, 1 mol 1-phenyl-3-methyl-5-pyrazolone. | reddish brown. |
| 4,4'-diaminodiphenyl-urea-3,3'-dicarboxylic acid. | 2 mol 2,6-dihydroxynaphthalene-1-aldoxime. | reddish grey. |
| Do.... | 2 mol respropiophenone oxime. | brownish bordeaux. |
| Do.... | 2 mol 2-hydroxy-4-aminoacetophenone oxime. | reddish brown. |
| Do.... | 2 mol mixed urea of 2-amino-5-hydroxynaphthalene-7-sulfonic acid and 2-hydroxy-5-aminoacetophenone oxime. | violet. |
| 4,4'-diaminodiphenyl.... | 1 mol salicylic acid, 1 mol monoazo dyestuff from diazotized 3-amino-2-hydroxybenzene-1-carboxylic acid-5-sulfonic acid and resacetophenone oxime. | reddish brown. |

Example 5

28.5 grams of 2-hydroxy-5-(4'-aminobenzoyl)-aminoacetophenone oxime are dissolved in 200 cc. of water and 4 grams of NaOH, 69 cc. of a 10 percent sodium nitrite solution are added and the mixture is stirred into 225 cc. of 2 n hydrochloric acid at 0–2° C. Stirring is continued for further 30 minutes and the diazotization mixture is added to a solution of 17.5 grams of resacetophenone oxime in 500 cc. of water and 53 grams of sodium carbonate. After the coupling is completed, the mixture is adjusted to pH 9 by means of acetic acid, heated to 60–70° C. and the dyestuff is sucked off. It corresponds to the following formula:

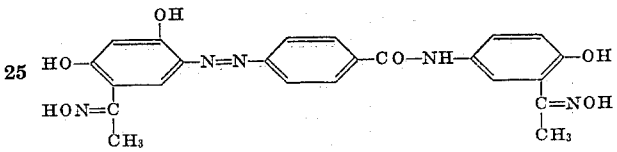

The after-coppered dyeing on cotton is brownish yellow and shows very good fastness to washing.

Example 6

35.4 grams of 5-amino-2-methoxy-acetophenone oxime are diazotized in customary manner in hydrochloric acid medium and coupled with 60 grams of 2-hydroxynaphthalene-5-sulfonic acid in sodium carbonate alkaline medium. The dyestuff is salted out at 80° C. and filtered off. To the solution of the dyestuff in 2000 cc. of hot water, a solution prepared from 80 grams of copper sulfate, 800 grams of water, 150 grams of glycerol and 85 grams of a 50 percent caustic soda solution is added, and the mixture is kept for 6 hours at 95–100° C., whereby the dyestuff is coppered with elimination of the methyl group. The copper complex dyestuff separates. On the next morning it is filtered cold, washed with water and dried. The dyestuff dissolves in water with a blue-red color and represents the copper complex of the monoazo dyestuff of the following formula:

$$\underset{\underset{CH_3}{|}}{HON=C} \qquad HO$$

(HO-phenyl-N=N-naphthyl-SO_3Na)

Example 7

26.4 grams of 1-amino-2,5-dichlorobenzene-4-sulfonic acid are diazotized in customary manner in hydrochloric acid medium and coupled with 13 grams of o-hydroxybenzaldehyde in sodium carbonate alkaline medium, 4 grams of NaOH being used for dissolving the azo component. After the coupling is completed the dyestuff is fully separated by adding sodium chloride and then sucked off. The dyestuff paste is boiled in 1000 cc. of water under addition of 14 grams of hydroxylamine hydrochloride and 28 grams of crystallized sodium acetate for 2 hours. On cooling the dyestuff precipitates almost completely out of the solution. It corresponds to the formula:

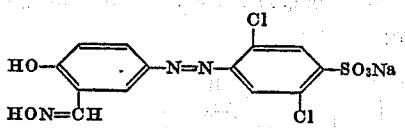

When dyed on wool and after-chromed, clear orange-brown shades are obtained.

Example 8

17.7 grams of 5-(4'-aminobenzoylamino)-2-aminobenzoic acid are suspended in 375 cc. of 2 n hydrochloric acid and 250 cc. of water, to which suspension 90 cc. of a 10 percent sodium nitrite solution are added at 0° C. After stirring for some time, the solution is neutralized with sodium carbonate. A suspension of 9.6 grams of 2-hydroxyacetophenone oxime in 165 cc. of 2 n sodium carbonate solution and 125 cc. of water is poured in this neutral diazonium salt solution and the mixture is then stirred for 3 hours at 0–3° C. Thereafter a solution of 25.5 grams of 2-(4'-aminobenzoylamino)-5-hydroxynaphthalene-7-sulfonic acid in 125 cc. of 2 n sodium carbonate solution is added drop by drop within 10 minutes. After 2 hours 87 cc. of 1 n caustic soda solution are added and the solution is stirred until the coupling is completed. The dyestuff thus formed is sucked off, dissolved in 325 cc. of 1 n caustic soda solution and 1750 cc. of water, 44 cc. of a 10 percent sodium nitrite solution are added and 690 cc. of 2 n hydrochloric acid are dropped in with stirring at 0–3° C. After 4 hours this diazo solution is stirred into a solution of 10 grams of 2-hydroxyacetophenone oxime in 500 cc. of 1 n caustic soda solution and the pH-value is maintained at 8–9 by adding sodium carbonate. When the coupling is completed the dyestuff is salted out at 50–70° C., sucked off and dried. It corresponds to the following formula:

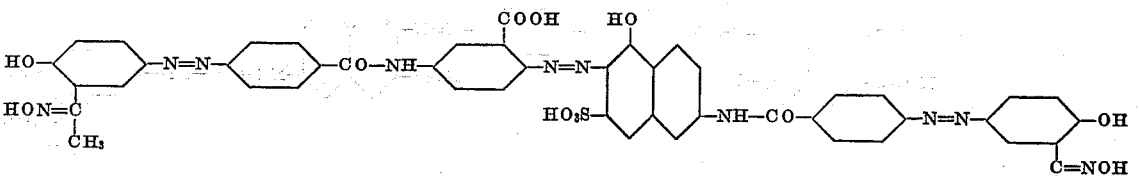

When dyed on cotton and after-coppered a red-brown dyeing is obtained showing very good fastness to washing and to light.

Example 9

A solution of 11.2 grams of 1-phenyl-3-methyl-5-pyrazolone in 68 cc. of 1 n caustic soda solution is dropped into the solution of the one sided coupling product of 5-(4'-aminobenzoylamino)-2-aminobenzoic acid and 2-hydroxyacetophenone oxime obtained according to Example 8 at 0–3° C., stirring being continued until the coupling is completed. The dyestuff is sucked off and dried. It corresponds to the formula:

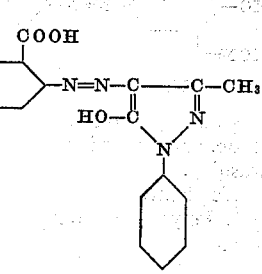

When dyed on cotton and after-coppered a reddish yellow is obtained showing very good fastness to washing and to light.

Example 10

7 grams of 4,4'-diaminodiphenyl-3,3'-dicarboxylic acid are diazotized in customary manner. A solution of 8.6 grams of 2,8-dihydroxynaphthalene-3-carboxylic acid-6-sulfonic acid in 200 cc. of water and 25 cc. of 2 n sodium carbonate solution is dropped into this diazonium salt solution at 0–3° C. Sodium bicarbonate is added until a pH-value of 7.5–8 is reached. When the coupling is completed the suspension of the one sided coupling product thus obtained is added to a solution of 11.9 grams of the mixed urea from 5-amino-2-hydroxyacetophenone oxime and 2-amino-5-hydroxynaphthalene-7-sulfonic acid in 400 cc. of water and 40 grams of anhydrous sodium carbonate at 0° C. After the coupling is completed the dyestuff is salted out at 80–90° C., sucked off while still hot, and dried. The dyestuff corresponds to the formula:

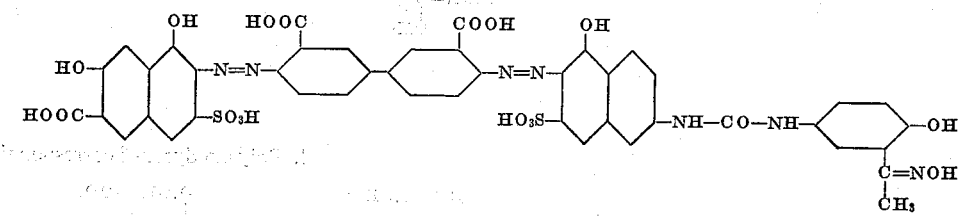

When dyed on cotton and after-coppered a reddish dark-blue is obtained showing good fastness to washing and to light.

Example 11

The dyestuff obtained in customary manner by diazotizing 12.8 grams of the potassium salt of 4,4'-diaminodiphenyl-3,3'-dioxyacetic acid and coupling with 12.6 grams of 2-amino-5-hydroxynaphthalene-7-sulfonic acid is dissolved in 750 cc. of water and 100 cc. of 1 n caustic soda solution. This solution is mixed with 36 cc. of a 10 percent nitrite solution and then stirred into 300 cc. of 2 n hydrochloric acid at 0–3° C. The suspension of the diazonium salt thus obtained is stirred into a solution of 8.7 grams of 4-methyl-2-hydroxyacetophenone oxime in 300 cc. of water, 100 cc. of 1 n caustic soda solution and 55 grams of anhydrous sodium carbonate at 0–3° C. When the coupling is completed the dyestuff is salted out at 60–65° C., sucked off and dried. It corresponds to the formula:

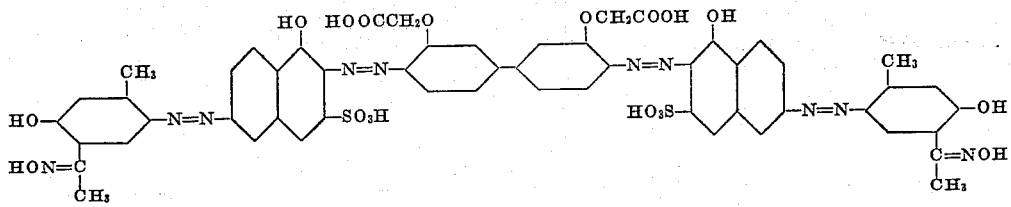

When dyed on cotton and after-coppered a grey-blue is obtained showing very good fastness to light and to washing.

We claim:
1. Polyazo dyestuffs corresponding to the general formula

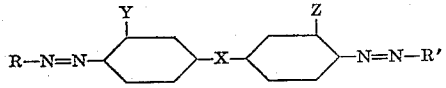

wherein X stands for a link selected from the class consisting of a carbon-carbon-linkage, the radical —NHCO, the radical —NHCONH—, and the radical —N=N—, Y and Z stand for radicals selected from the group consisting of H, —OCH₃, —OH, —COOH and —OCH₂COOH, R stands for the radical of a coupling component selected from the benzene and the naphthalene series and containing in a benzene nucleus (1) an hydroxy group and (2) the group

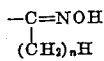

in ortho-position to each other, wherein $n$ is a whole number from 0 to 7, both inclusive, and R′ stands for the radical of coupling components selected from the group consisting of radicals of the benzene and naphthalene series containing in a benzene nucleus (1) an hydroxy group and (2) the group

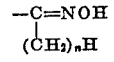

in ortho-position to each other, wherein $n$ is a whole number from 0 to 7, both inclusive, radicals of the benzene series, containing an ortho-hydroxy-carboxy-grouping, and radicals of the benzene, naphthalene and pyrazolone series being coupled in ortho-position to an hydroxy group.

2. Polyazo dyestuffs according to claim 1 where, in the radical of the coupling component, the benzene nucleus containing (1) an hydroxy group and (2) the group

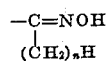

in ortho-position to each other, wherein $n$ is a whole number from 0 to 7, both inclusive, is linked to the —N=N— bridge by means of a radical selected from the group consisting of radicals of the benzene and naphthalene series.

3. Polyazo dyestuff corresponding to the formula

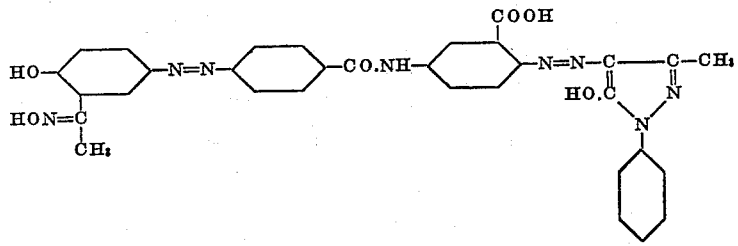

4. Polyazo dyestuff corresponding to the formula

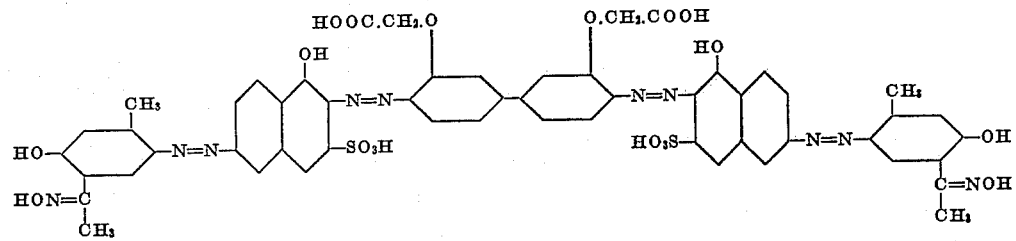

5. Polyazo dyestuffs corresponding to the formula:

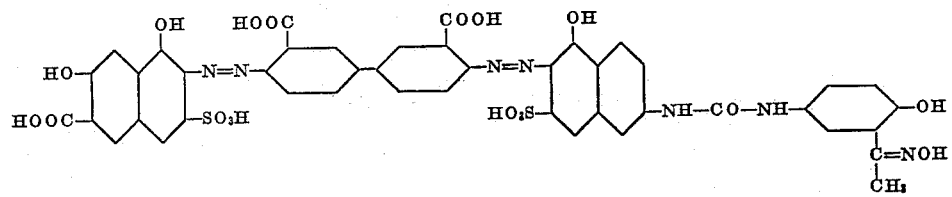

6. Polyazo dyestuff corresponding to the formula:

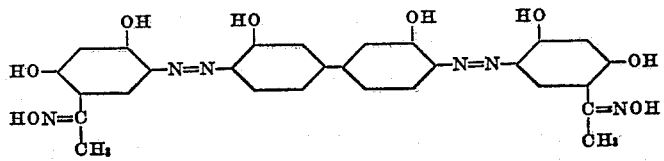

7. Polyazo dyestuff corresponding to the formula:
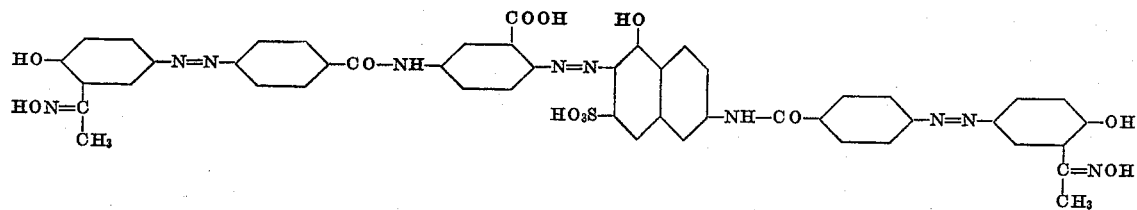
No references cited.